United States Patent [19]
Earp et al.

[11] 3,924,236
[45] Dec. 2, 1975

[54] SURVEILLANCE RADAR WITH SYNTHETIC ARRAY SCAN FOR IMPROVED ANGLE DETERMINATION

[75] Inventors: Charles William Earp, London; Carl Peter Sandbank, Bishop's Stortford; Frances Giles Overbury, Cuffley; Paul Barton, Bishop's Stortford; Peter Kenneth Blair, Harlow, all of England

[73] Assignee: International Standard Electric Corporation, New York, N.Y.

[22] Filed: Nov. 25, 1974

[21] Appl. No.: 526,853

[30] Foreign Application Priority Data
Nov. 27, 1973 United Kingdom............... 54971/73

[52] U.S. Cl............................. 343/16 R; 343/113 R
[51] Int. Cl.²......................... G01S 9/02; G01S 3/50
[58] Field of Search....................... 343/16 R, 113 R

[56] References Cited
UNITED STATES PATENTS
3,419,845  12/1968  Thiede et al................. 343/16 R X
3,487,408  12/1969  Clarke........................... 343/16 R X

*Primary Examiner*—T. H. Tubbesing
*Attorney, Agent, or Firm*—W. T. O'Neil

[57] ABSTRACT

A synthetic aperture radio direction finding device having means for pulse illuminating objects within an angular sector of interest and a receiving array, each element of which has an independent output, for receiving echo pulses; a delay line with a number of taps equal to the number of said array elements, each tap receiving one element output after discrete mixing for each element against a common offset frequency. A bank of narrow band filters receives the delay line output and provides an output from a discrete one of said filters as a function of the angle of a reflecting object within the angular sector of interest.

9 Claims, 11 Drawing Figures

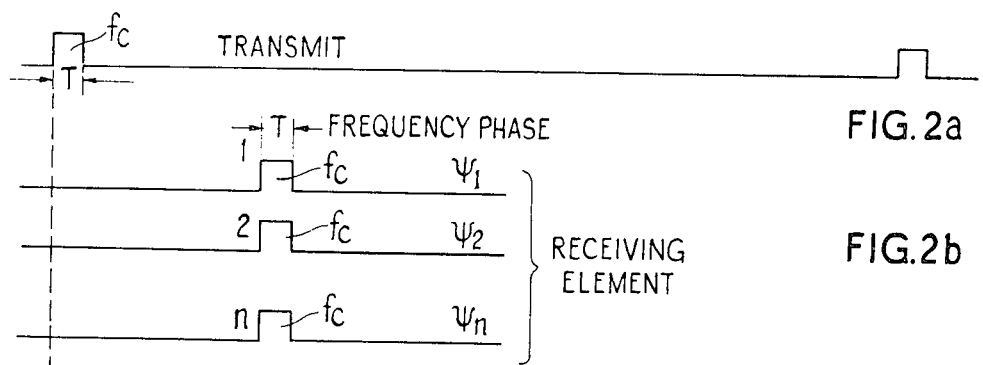
FIG. 2a
FIG. 2b
FIG. 2c
$$\psi_n - \psi_{n-1} = 2\pi d \sin\theta$$
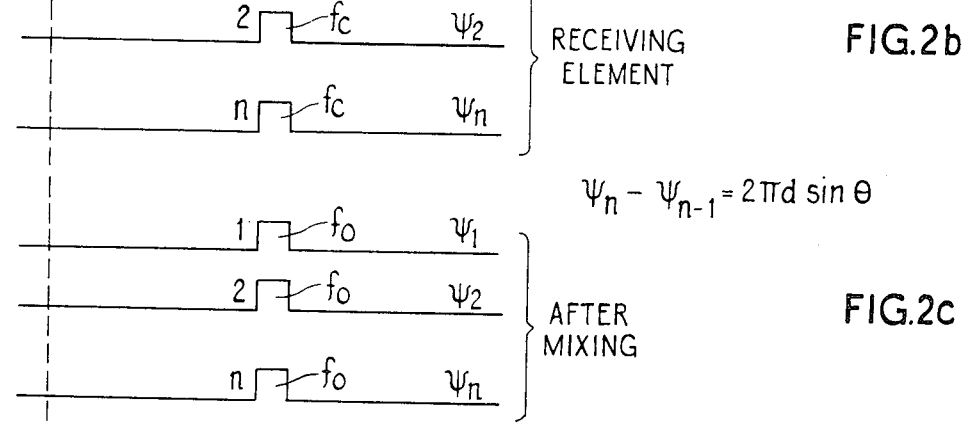
FIG. 2d
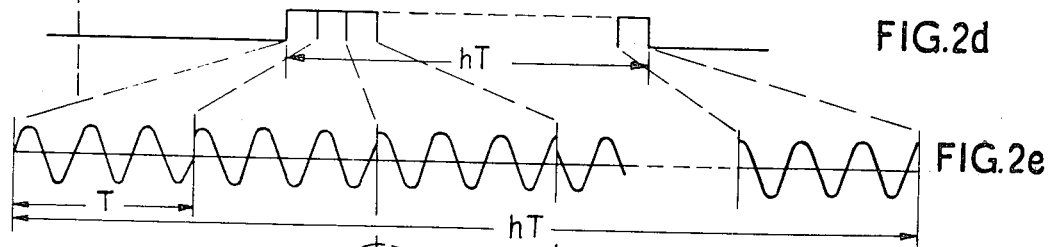
FIG. 2e
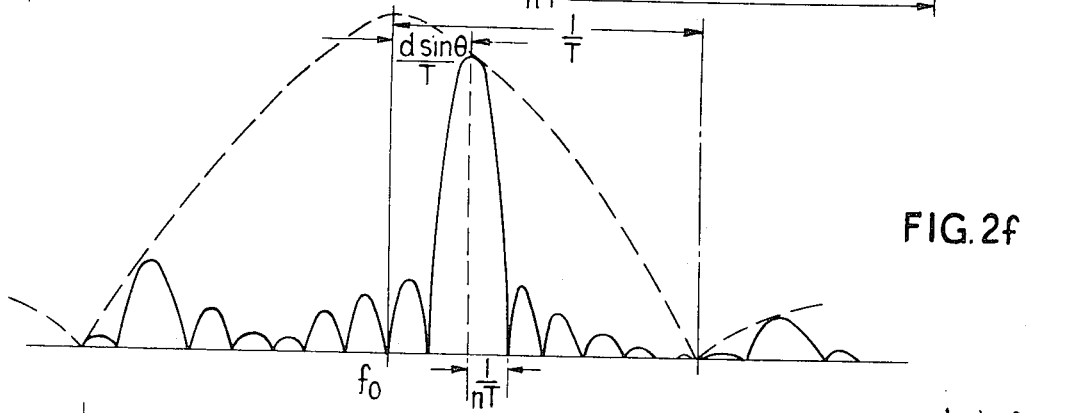
FIG. 2f
$$f = f_0 + \frac{d \sin\theta}{T}$$
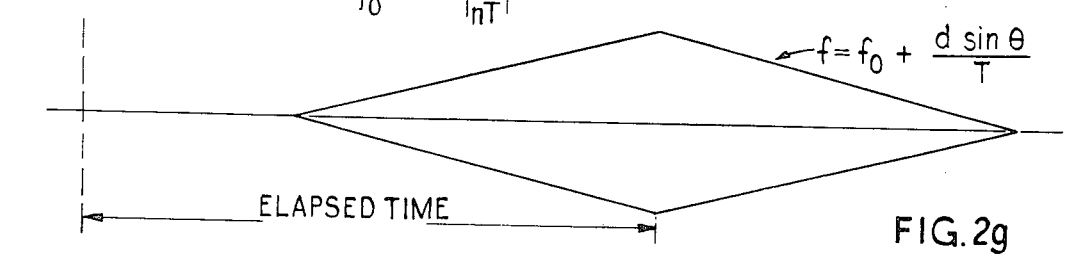
FIG. 2g

SURVEILLANCE RADAR WITH SYNTHETIC ARRAY SCAN FOR IMPROVED ANGLE DETERMINATION

BACKGROUND OF THE INVENTION

1. Field of the Invention

The present invention relates to radio direction finding in general, and more specifically to direction finding by means of synthetic scan (synthetic aperture).

2. Description of the Prior Art

In the prior art, direction finding technique such as VOR, TACAN, etc., have been extensively used and are well understood by those skilled in the electronic arts. Background information is widely available in published form, the text "Electronic Avigation Engineering" by Peter C. Sandretto, published by International Telephone and Telegraph Corporation (1958) being a particularly useful reference in that connection.

The techniques and systems of Radar have also been extensively applied to the problem. A useful reference in understanding the state of that particular art is the text "Radar Handbook" by Merrill I. Skolnik, (McGraw Hill 1970).

Of considerable recent interest is the so-called Doppler ILS, which employs a ground radio beacon having a multi-element linear array to the elements of which an RF source is switched sequentially to provide a simulated Doppler effect as "seen" at a remote point. Such systems provide for air derivation of angle information and are particularly useful as terminal area navigation systems (aircraft approach and landing). A reference of interest in that art is U.S. Pat. No. 3,613,096.

Each apparatus capable of making angle determinations (finding direction) has some advantages and its own peculiar set of disadvantages. For example, mechanically scanned direction finders and surveillance radars are subject to the inherent uncertains, size, weight and cost connected with precision mechanical devices in general. Also, slow scanning devices have data rate problems, and inertialess scanners, such as in frequency scan radar, require large and sometimes unavailable, frequency band allocation.

The manner in which the present invention deals with prior art problems and disadvantages to provide an advantageous structure and function will be evident as this description proceeds.

SUMMARY OF THE INVENTION

According to one aspect of the invention there is provided radio direction finding equipment for deriving angular information in respect to the position of a mobile craft from radio frequency pulses received or reflected from the craft, including receiving antenna means responsive to each said radio frequency pulse to produce a series of n simultaneous signals each of the same duration and frequency as the received pulse with a phase differential between successive signals of the series which is a function of the angle subtended by the craft with respect to said antenna means. Additional means including means to transfer the phase differential to a series of n simultaneous beat signals, each of the same duration, as the received pulse and at a frequency which is integrally related to the reciprocal of the duration of the received pulse, means responsive to said series of $n$ beat signals to deliver an output signal of duration n times the duration of the received pulse and having a peak spectral content at a frequency which is shifted from said beat frequency by an amount indicative of said angle, and means responsive to said output signal to determine said angle, are included.

According to another aspect of the invention, there is provided radio direction finding equipment for deriving angular information in respect to the position of a mobile craft from radio frequency pulses received from the craft, including a linear array of n spaced antenna elements for receiving said pulses, n mixers each having one input connected to a different one of those elements and another input connected to a common source of a radio frequency (offset from the radio frequency of the pulsed source) with the offset frequency being integrally related to the reciprocal of the duration of each said radio frequency pulse. The output of each of the mixers is the offset frequency $fo$, a delay line having $n$ input taps, with a delay time between adjacent taps equal to the duration of each of the radio frequency pulse is provided, successive ones of those input taps being connected to corresponding successive ones of the mixer outputs. Connected in parallel with the output of the delay line is a plurality of narrow band filters each centered on a different frequency within the range of output frequencies of the delay line.

The above equipment may be incorporated in a surveillance radar-system, a secondary radar system, or a navigational guidance system.

The invention will be better understood from the following description in conjunction with the accompanying drawings.

BRIEF DESCRIPTION OF THE DRAWINGS

FIGS. 2a–2g show waveforms at different points in the system of FIG. 1.

DESCRIPTION OF THE PREFERRED EMBODIMENT

A pulsed surveillance radar system for determining range or azimuth angle is described first.

Figure 1:
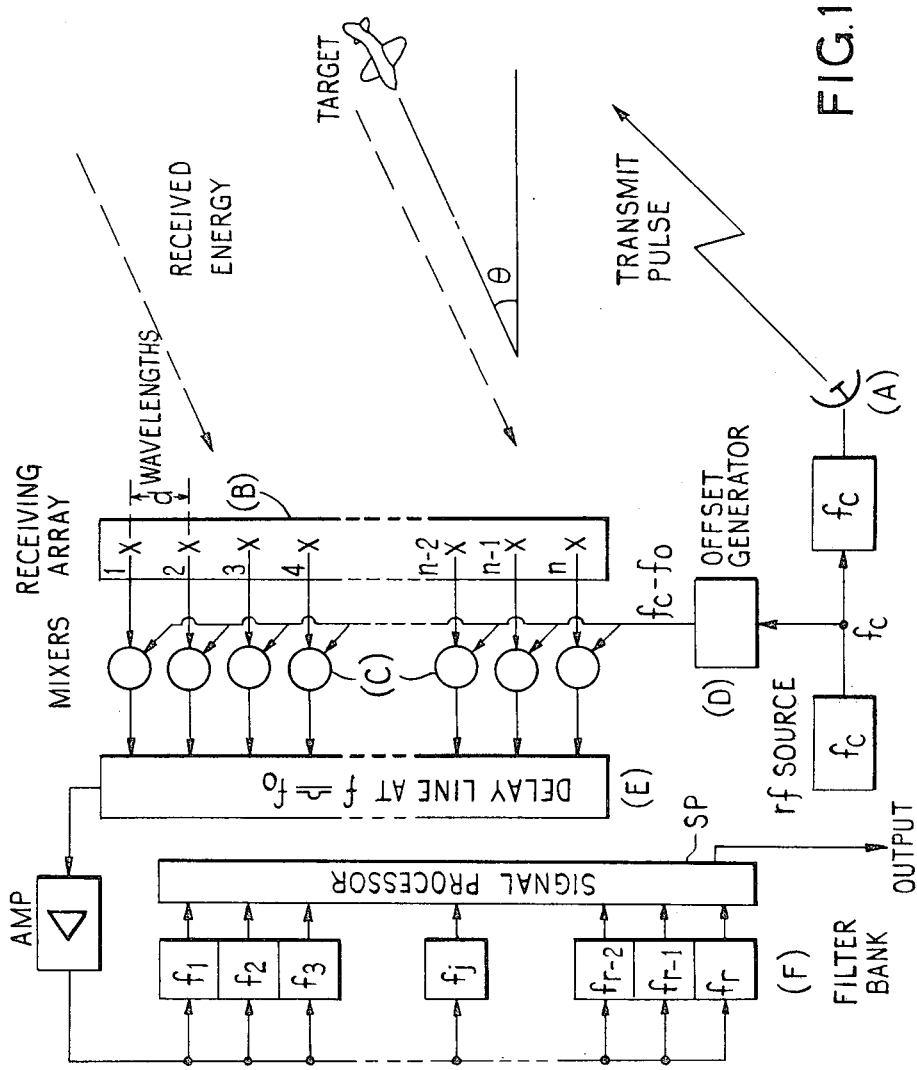
FIG. 1 shows a surveillance radar system including equipment embodying the invention, with a single receiving antenna array.

Referring to FIG. 1, a transmitting antenna (A) is pulsed with a radio frequency $f_c$. The pulse duration T, FIG. 2(a), and repetition rate $f_r$ are determined by the normal constraints of range resolution and maximum range for a radar system. Each of these transmitted pulses, floods the whole coverage sector since the antenna A is designed to provide a pattern which illuminates the entire angular sector of interest.

Consider now a target in that sector. A reflection occurs and is received by a horizontal linear array (B) composed of $n$ antenna elements. This array orientation is consistent with azimuth angle determination. (It may well be arranged that the array has a limited coverage in elevation to conserve radiated power).

The output of each element, depicted at FIG. 2(b), is mixed in plural mixers (C) with an offset radio frequency $(fc-fo)$ generated by the device (D). The lower sideband output from each of the individual mixers at $(c)$, at a frequency $fc - (fc-fo) = fo$ [timed as at FIG. 2(c)], is applied to an input tap of a delay line (E). The offset signal is common to all mixers, and successive mixer outputs are applied to successive input taps of the delay line as shown, with a delay time between taps of T seconds (T being the transmitted pulse duration). The output of the delay line due to the reflection from the target is therefore a pulsed signal of duration $nT$, FIG. 2(d), where $n$ is the number of elements in the linear array. The offset frequency is chosen to be integrally related to $1/T$, i.e., $fo = N/T$. This means that a whole number of cycles of fo occur in each T second period from the delay line.

The received differential RF phase between adjacent array elements is determined by the path length difference. If the element spacing is $d$ wavelengths and the target is at an angle $\theta$ to array boresight, then the RF phase differential between successive elements is $2\pi d \sin\theta$ radians. This phase change is transferred to the beat signal at $fo$, so that the delay line output consists on $n$ packets at $fo$ (duration of each $= T$) with a discontinuity (phase transient) of $2\pi d \sin\theta$ between successive packets, FIG. 2(e). This is the means of producing an apparent frequency shift of the beat signal received from the target. That is, the pulsed signal from the delay line of duration $nT$ has peak spectral content at $$f = fo + \frac{d \sin\theta}{T} \text{Hz},$$

FIG. 2(f).

The output of the delay line is applied to a bank of $r$ narrow band filters (F), each individual filter being responsive to a different beat frequency.

The center frequencies of filters 1, 2, 3 etc. are:

$$f_1 = f_o + \frac{d \sin\theta 1}{T}$$

$$f_2 = f_o + \frac{d \sin\theta 2}{T}$$

$$f_3 = f_o + \frac{d \sin\theta 3}{T}$$

$$\vdots$$

$$f_r = f_o + \frac{d \sin\theta r}{T}$$

Thus a target at an angle $\theta j$ from boresight will produce a maximum response from the $j$th filter. If the filter frequency response is matched to the signal, then the peak output, FIG. 2(g), from the filter is effectively a coherent sum of the received energy across the whole antenna baseline.

The range of the target is determined by the time which elapses between transmission of the RF pulse and the time at which the peak response from the filter occurs.

As described above, the signal from the antenna elements is "tagged" in time or frequency. Identification of the individual contributions by each antenna element may be achieved by splitting the signal into a train of coded pulses. This may be accomplished by any of a number of known encoding techniques represented generally by the signal processor SP (FIG. 1). The output of SP may be presented on a display or may be transmitted to the remote station.

The comparison will now be made between a scanned beam surveillance radar system and the system described above.

The peak received power density across the receiving antenna from target reflection is proportional to the gain of the transmitting antenna. For a scanned beam, the peak power density at the receiver from a reflection in any one part of the sector is G times that from an isotropic transmission; however, pulses are received from this sector for only a fraction of the time ($=1/G$). In the isotropic case, received pulses from the target occur all the time but at a nominal level. Thus, the total received energy density over a period (one second for example) is roughly equal in both cases.

For the scanned beam case, this energy is coherently picked up across a baseline of a number of wavelengths by (essentially) summing inphase RF contributions across the aperture. In the above described system, this energy is collected over the whole aperture, down-converted in frequency, and, after passage through the delay line, applied to a bank of filters, one of which will form a coherent sum of all the energy received. The output of the scanned beam system will contain $fr/G$ pulses in one second ($fr$ = transmitted pulse repetition rate) and will yield that number of measured position values for the target. These values can be averaged to give a more accurate result.

In the above described system, pulses occur at the rate of $f_r$ per second, but at a lower peak power level. Over one second, the ability to form a better average with more samples is roughly balanced by the fact that each sample is at a lower power level.

Thus, for comparable baseline, the two techniques are roughly equal in respect to power budget. They system of the invention obviously provides relief from the hereinabove prior art disadvantages, however.

Figure 3:
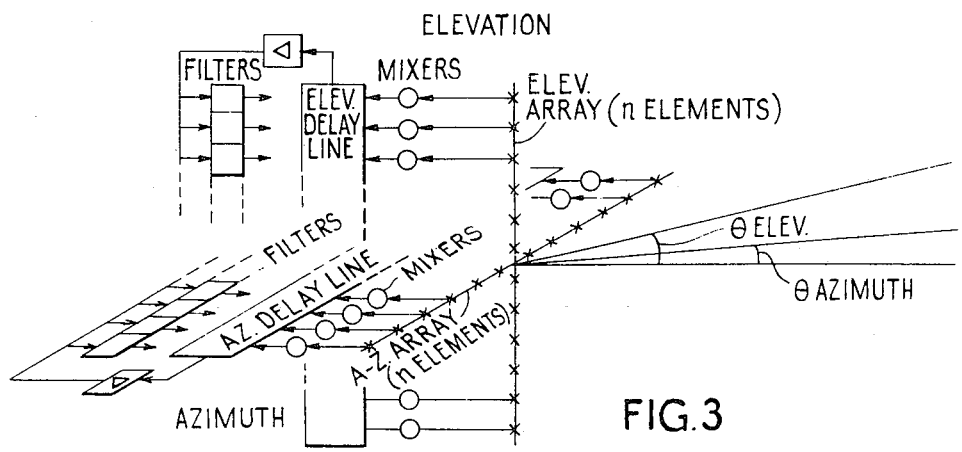
FIGS. 3, 4 and 5 show, respectively, two orthogonal receiving antenna arrays three mutually orthogonal antenna arrays, and a rectangular array of receiving antenna elements.

The use of two systems, as described, with crossed arrays, see FIG. 3, for solid angle coverage (elevation and azimuth) is obviously possible, the separate outputs being separately displayed or relayed or mixed to provide a composite position showing.

Figure 4:
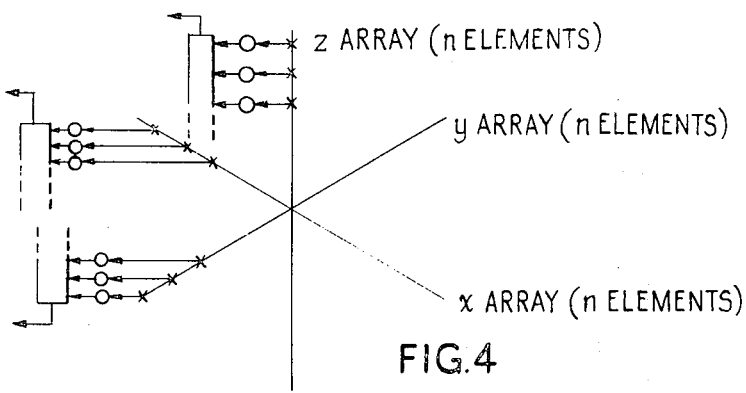

Three mutually orthogonal systems (FIG. 4) for complete angular coverage may also be arranged.

Figure 5:
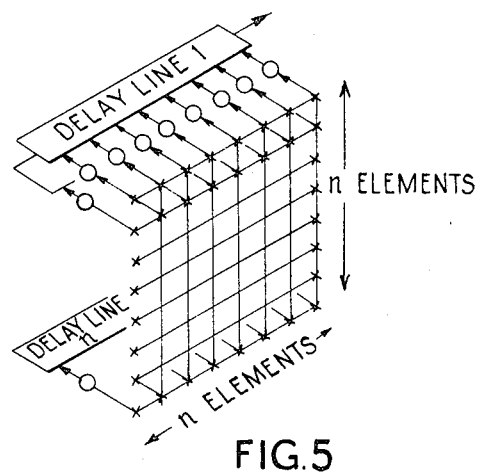

A filled-in rectangular or square aperture with $n^2$ elements (FIG. 5) where each element is applied to a mixer and the signals changed in frequency by multiplication with an offset radio frequency is also possible. The down-converted signals are then applied to delay lines and subsequently to narrow band filters. Such an arrangement would be able to realize the full power gain characteristics of a filled-in square array.

The system of the invention is operable as a secondary radar system. The transmitted pulse from the ground system is received for example by an aircraft, which responds by transmitting another pulse. This is received by the array and the signals processed in the manner already described.

Still further, use as a ground-derived Doppler navigation system is possible. The pulses are initiated by the vehicle, ship or aircraft, and angle data is derived on the ground in the manner described. The data is coded in suitable form as in signal processor SP (FIG. 1) and transmitted back to the vehicle.

Finally, a vertical receiving array and associated electronics as described herein may be used independently, or as an addition to a conventional range-Azimuth surveillance Radar System to provide the added dimension of elevation angle information.

It is to be understood that the foregoing description of specific examples of this invention is made by way of example only and is not to be considered as a limitation

What is claimed is:

1. Radio direction finding equipment for deriving angle information in respect to the position of a mobile craft from radio frequency pulses received from the craft, comprising:

receiving antenna means responsive to each of said radio frequency pulses to produce a series of $n$ simultaneous signals each of the same duration and frequency as the received pulse but with a phase differential between successive signals of said series which is a function of the angle subtended by the craft with respect to said antenna means;

means for transferring said phase differential to a series of n simultaneous beat signals each of the same duration as said received pulse and at a frequency which is integrally related to the reciprocal of the duration of each received pulse; means responsive to said series of n beat signals to deliver an output signal of duration $n$ times the duration of said received pulse and having a peak spectral content at a frequency which is shifted from said beat frequency by an amount indicative of said angle;

and means responsive to said output signal to discretely determine said angle.

2. Apparatus according to claim 1 in which said antenna means comprises at least one linear array of $n$ spaced antenna elements.

3. Apparatus according to claim 2 in which said antenna means comprises two linear arrays normal to one another and each comprising $n$ spaced antenna elements.

4. Apparatus according to claim 1 in which said antenna means comprises three mutually orthogonal linear arrays each comprising $n$ spaced aerial elements.

5. Apparatus according to claim 1 in which said antenna means comprises an array of $n^2$ spaced antenna elements.

6. Apparatus according to claim 2 in which said means for transfering comprises, for each of said antenna means, $n$ mixers each having as one input a different one of said $n$ simultaneous signals corresponding to a discrete element of said array, and as another input a radio frequency offset from the pulse radio frequency, with the offset frequency being integrally related to the reciprocal of the duration of each said radio frequency pulses.

7. Apparatus according to claim 2 in which said means responsive to said beat signals comprises a delay line having $n$ input taps, with a delay time between adjacent taps equal to the duration of each of said radio frequency pulses, successive ones of said taps having as input corresponding successive ones of said beat signals.

8. Apparatus according to claim 2 in which said means responsive to said output signal comprises a plurality of narrow band filters each centered on a different frequency within the range of said output signal, the output of each of said filters corresponding to a discrete angle in respect to the position of said mobile craft.

9. Radio direction finding equipment for deriving angle information in respect to the position of a mobile craft from radio frequency pulses reflected from said craft, comprising:

means for transmitting illuminating pulses covering the entire sector of interest within which said angle information is to be derived;

a linear array of n spaced aerial elements for receiving said reflected pulses;

$n$ mixers each having one input connected to a different one of said antenna elements and another input connected to a common source of a radio frequency offset from the frequency of said pulse radio frequency, said offset frequency being integrally related to the reciprocal of the duration of each said radio frequency pulses, the output of each said mixer being said offset frequency;

a delay line having $n$ input taps, with a delay time between adjacent taps equal to the duration of each of said radio frequency pulses, successive ones of said input taps being connected to corresponding successive ones of said mixer outputs;

and a plurality of narrow band filters each centered on a different frequency within the range of output frequencies of said delay line, said filters having their inputs all connected to the output of said delay line.

* * * * *